United States Patent [19]

Whiteford

[11] Patent Number: 4,503,624

[45] Date of Patent: Mar. 12, 1985

[54] COMBINATION SQUARE, SCRIBING TOOL AND PLUMB LEVEL

[76] Inventor: Carl Whiteford, 3 High Point Rd., Westport, Conn. 06880

[21] Appl. No.: 485,113

[22] Filed: Apr. 14, 1983

[51] Int. Cl.³ .............................................. G01C 9/24
[52] U.S. Cl. ......................................... 33/451; 33/42; 33/379; 33/480
[58] Field of Search ................. 33/42, 41 R, 480, 481, 33/451, 381, 379

[56] References Cited

U.S. PATENT DOCUMENTS

| 825,217 | 7/1906 | Hull et al. | 33/381 X |
| 844,243 | 2/1907 | Breul | 33/42 |
| 854,659 | 5/1907 | Matthews | 33/42 |
| 2,752,693 | 7/1956 | Wullschleger | 33/379 |
| 2,948,067 | 8/1960 | Mistretta | 33/381 |

FOREIGN PATENT DOCUMENTS

| 77303 | 1/1960 | France | 33/379 |
| 607439 | 8/1960 | Italy | 33/480 |

Primary Examiner—Harry N. Haroian
Attorney, Agent, or Firm—Martin D. Wittstein

[57] ABSTRACT

A combination tool is basically a carpenter's square in which an elongate blade is connected perpendicularly to an elongate handle. The blade has measuring scales on opposite edges each of which commence at the adjacent edge of the handle, and lines extend across the blade to permit easy visual alignment of both scales. Elongate apertures are formed along each line to facilitate use of the square as a scribing tool. The handle is a clear plastic hollow shell which is substantially filled with a liquid except for a small bubble so that the handle can function as a plumb level.

2 Claims, 5 Drawing Figures

COMBINATION SQUARE, SCRIBING TOOL AND PLUMB LEVEL

BACKGROUND OF THE INVENTION

The typical carpenter's square has been well known for many centuries and is a very necessary and useful tool in most fields of construction. Hardly anyone, whether professional carpenter or craftsman or mere amateur do-it-yourself home builder, has ever done any woodworking without having had to employ a square at one time or another. The square is the only convenient tool for assuring that two pieces of material have been fitted together exactly perpendicularly to each other, or that a single piece of material has adjacent edges which meet at a right angle. As is well known in many forms of professional or home workshop construction, it is most critical that complimentary pieces of material fit together at a 90° angle, or that individual pieces have adjacent edges which meet at a 90° angle, in order for the finished product to be properly constructed in terms of rigidity, strength and aesthetic appearance.

Although the basic configuration of the carpenter's square has remained unchanged since the square was first developed, many improvements have been made which have substantially increased the efficient utilization of the square, as a result of which many different types of squares exist today. For example, the professional carpenter's square is still nothing more than a single piece of metal formed in the shape of an "L", that is, two legs joined to each other at a 90° angle, each leg having markings thereon to indicate increments of linear measurement. Typically, the legs of this type of square are unequal and between 1 and 2 feet long since the square is used where the pieces of material have large dimensions, such as in the construction of a house.

Another common type of square, known as a try square, is typically found in a basement workshop, and has a rectangular steel blade which has markings adjacent opposite longitudinal edges, usually extending about 6 to 12 inches, depending on the size of the square, and having a handle, generally wooden, rigidly connected to one end of the blade, the handle extending about 3 to 5 inches in length at a 90° angle to the longitudinal axis of the blade. Typically a wooden handle has strips of metal attached to the opposite longitudinal edges thereof, and the handle is thicker than the blade so as to extend outwardly from the blade adjacent to both lateral surfaces. By this arrangement, the metal edge of the handle portion can be placed against one edge of a piece of lumber and the blade will extend across the piece of lumber at precisely a 90° angle to the edge against which the handle of the square is resting. This type of square is extremely useful in measuring off lines across lumber at right angles to the longitudinal edges of the lumber for cutting into shorter lengths, and can also be used to assure that the edges are at a 90° angle to the opposite surfaces of the lumber.

Another type of square normally found in the home workshop has a generally triangular shaped handle which is slideably attached to a steel blade portion of the square so that it can be adjustably positioned on the blade portion in order to preset the square for repetitive scribing, and other uses. For example, if it is desired to draw a line along several pieces of lumber at the same distance from a longitudinal edge of each piece, the handle can be positioned along the blade so that a desired dimension will have the same position relative to a longitudinal edge each time the square is placed on a different piece of lumber, which position could even be the end of the blade remote from the handle. While this is a convenient function of such a square, it requires a relatively complex and expensive construction and a manipulation of the square in order to set it to the desired marking. One advantage of this type of square is that the nature of the handle is such that it often can accommodate a bubble level incorporated into the handle, with the result that the square can also be used as a plumb level to determine whether or not the edge of a piece of material is oriented either vertically or horizontally.

One of the major drawbacks of prior art try squares is that they were not designed to be conveniently and rapidly used in connection with the scribing of lines parallel to the longitudinal edge of a length of stock. In addition, in order to obtain the benefit of an adjustable combination square and plumb level, it has been necessary to obtain one of the more expensive and more complex type of square utilizing the adjustable handle described above. Still further, in connection with the above described type of square having a fixed handle, typically the handle is made of expensive well seasoned hard wood which requires accurate working to obtain a perfectly square alignment with the blade, and careful routing is required in order to provide the space for brass inserts which must be flush with the surface of the wood and which, in combination with rivets, serve to secure the handle to the blade portion of the square. Thus, a well constructed square of this type is relatively expensive.

SUMMARY OF THE INVENTION

The present invention relates generally to wood working tools and more particularly to a try square of the type which normally would be found in the home workshop and used by professional craftsmen.

The tool of the present invention obviates or substantially overcomes the disadvantages of prior art try squares and provides certain advantages and functions not heretofore available in a plain try square. More particularly, the novel features of the present invention are combined in a combination square, scribing tool and plumb level formed into a unitary construction which has no moving parts and which is extremely strong and durable, and cannot warp or shrink, and is relatively inexpensive to manufacture.

In one of its broader aspects, the present invention is embodied in a combination square, scribing tool and plumb level which has an elongate rectangular blade member which has a pair of opposed parallel longitudinal edges and a pair of opposed parallel faces, each of the faces having precisely spaced markings thereon along each of the longitudinal edges, the markings defining increments of linear measurement. The blade member also has a plurality of apertures formed therein which are precisely spaced along the blade member at preselected markings. These apertures permit the the square to be used as a marking gauge or scribing tool for drawing lines on pieces of material with great accuracy. An elongate handle member is connected to the blade member at one end thereof and at exactly 90° thereto.

In another of its broader aspects, the invention is embodied in a combination square, scribing tool and plumb level which has an elongate rectangular blade member having a pair of opposed, parallel longitudinal edges and a pair of opposed, parallel faces, at least one of the blade faces having spaced apart markings thereon along at least one of the longitudinal edges, the markings defining increments of linear measurement. An elongate handle member is connected to the blade member at one end thereof, the handle member having a pair of opposed parallel longitudinal side edges each disposed at a 90° angle to the longitudinal edges of the blade. A bubble type liquid level is contained within the whole handle between the longitudinal edges thereof.

In some of its more limited aspects, the aforementioned apertures are spaced both longitudinally along the length of the blade and laterally across the face width of the blade so as to retain a maximum amount of material strength of the blade member between closely spaced adjacent apertures. Also the apertures are elongate in the lateral direction of the blade and terminate in points facing the opposed longitudinal edges so that the point of a pencil or steel scriber, regardless of its thickness, will be guided at an absolutely precise dimension from the edge of the handle when the try square is used for scribing.

In another aspect of the invention, the handle portion is formed of a clear plastic material and is composed of two shells chemically or solvent welded together to form a cavity which contains a clear liquid having an index of refraction matched to the index of refraction of the plastic material. This combination renders the handle totally transparent so that it can be used effectively as a level and at the same time the material against which it is placed can be seen through the handle. In addition, the broad outer surfaces of the shells are molded to have a precise optical curvature which makes the entire central area of the handle useable as a magnifier so that anything observed through the handle would be magnified for better viewing, providing that the handle is held at the proper focal length away.

Having briefly described the general nature and construction of the present invention, it is a principle object thereof to provide an improved wood working tool having features and advantages combined in a one-piece try square not heretofore available.

It is another object of the present invention to provide a combination square, scribing tool or marking gauge and plumb level which incorporates each of these individual functions into a single relatively simple and easy to use tool, and one which is relatively inexpensive to manufacture.

These and other objects and advantages of the present invention will be more readily apparent from an understanding of the following detailed description of a preferred embodiment of the invention when considered in conjunction with the accompanying drawings in which:

FIG. 4 is a sectional view of the handle portion of the tool taken on the line 4—4 of FIG. 1.

Figure 1:
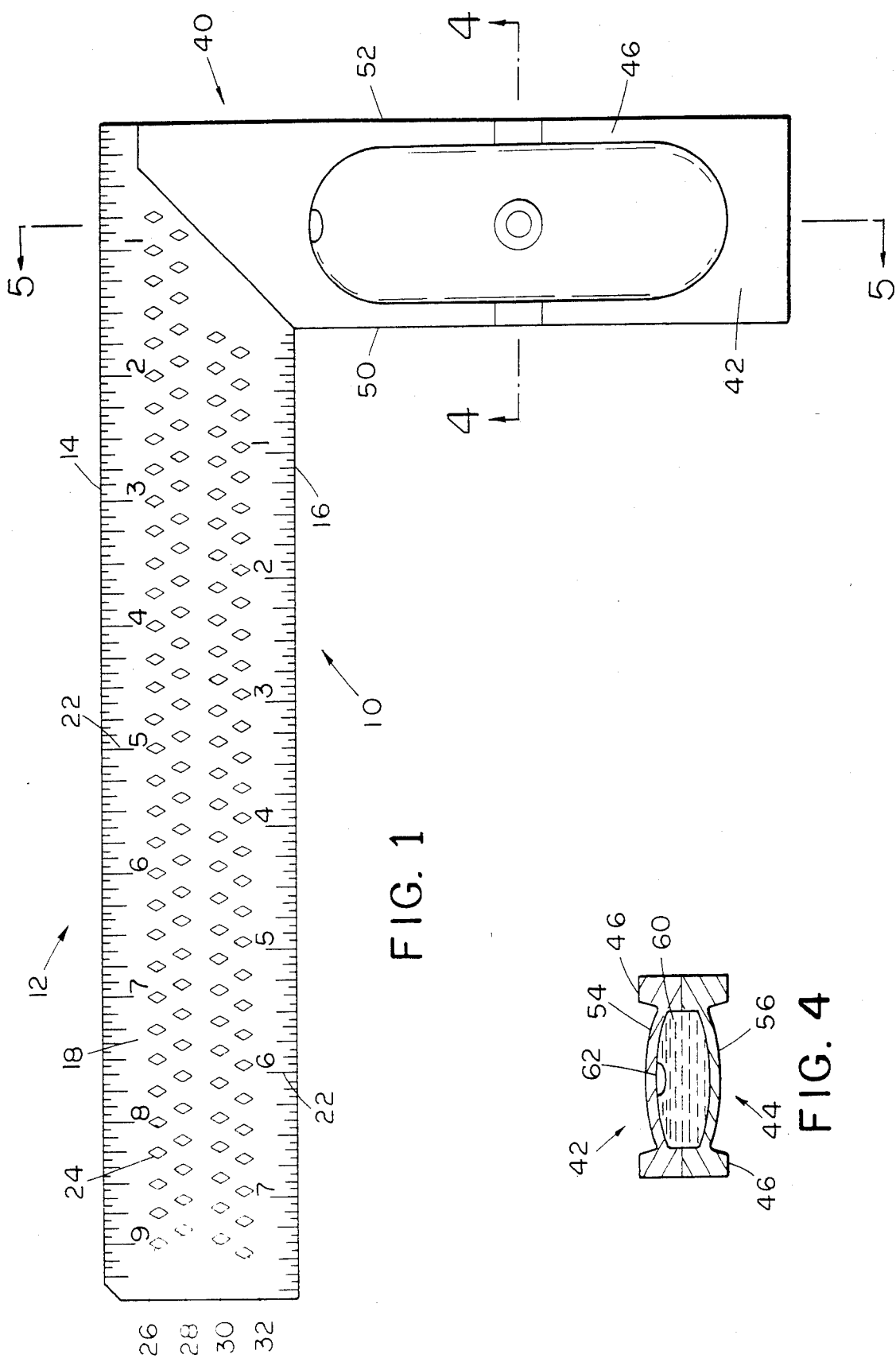
FIG. 1 is a plan view of the combination tool incorporating the features of the present invention.

Referring now to the drawings and particularly to FIG. 1 thereof, it will be seen that the combination tool of the present invention, generally indicated by the reference numeral 10, comprises an elongate rectangular blade generally indicated by the reference numeral 12. The blade 12 has a pair of opposed, parallel longitudinal edges 14 and 16, and a pair of opposed, parallel faces 18 and 20. Each of the faces 18 and 20 is provided with a plurality of spaced markings identified by the numeral 22. These markings are preferably spaced along each of the longitudinal edges 14 and 16 on both of the faces 18 and 20 of the blade number 12. In the particular square shown, the markings 22 designate increments of linear measurement of 1/16" for each increment, and markings of different length are utilized to indicate inch, half inch, quarter inch and eighth inch increments. This type of marking is typically found on 12 inch long rulers and other forms of measuring instruments. It should be noted that the increment markings on the longitudinal edge 14 commence at the extreme end of the blade number 12 adjacent to the handle portion yet to be described, while the increment markings on the longitudinal edge 16 commence at the intersection of the edge 16 with the adjacent edge of the handle portion yet to be described. The advantage of this feature is that the square can be used as effectively with one scale as the other for measuring distances from the edge of a piece of material toward the center.

Figure 2:
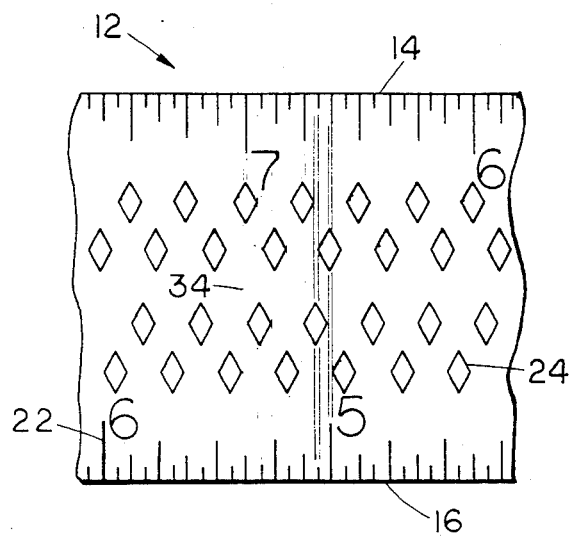
FIG. 2 is an enlarged section of a portion of the blade member of the tool shown in FIG. 1.
Figure 3:
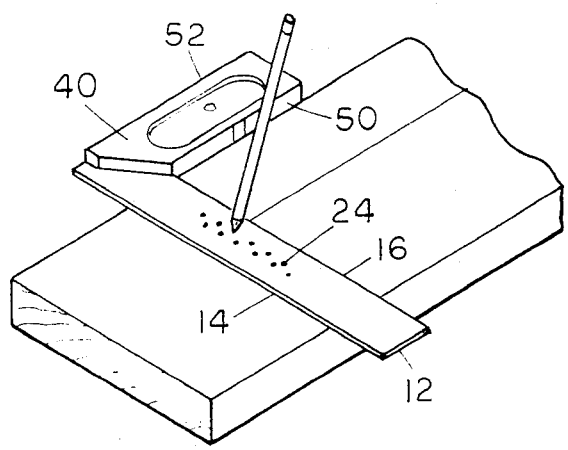
FIG. 3 is a perspective view showing the tool of the present invention as it would be used to perform a scribing function.

The blade 12 also includes a plurality of apertures 24, of which there are four longitudinally extending rows 26, 28, 30, and 32 of apertures which extend from the free end of the blade as far as they can go to where the blade joins with the handle portion. The apertures 24 collectively are spaced 1/16 of an inch apart, but they ae staggered in the pattern shown in the enlarged section of FIG. 2 for the purpose of maximizing the amount of material of the blade 12 between adjacent apertures in order to maintain a high degree of rigidity of the blade 12. Each of the apertures 24 are formed in the configuration of a diamond, or other shape which would have at least 2 points adjacent to each end of an opening 24 in the lateral direction of the blade 12 so as to hold the point of a pencil or other scribing tool in a fixed concentralized position with respect to the blade 12 as the square 10 is moved along a board in the manner shown in FIG. 3. It will be noted from FIG. 2 that the markings 22 extend laterally of the blade 12 for a relatively short distance, and that the surface of the blade 12 is etched or otherwise suitably marked in the manner indicated by the numeral 34 in FIG. 2 so that the markings 22 on one edge of the blade 12 can be quickly and easily lined up visually with the markings on the other longitudinal edge of the blade 12. Even though the scales of the markings adjacent the edges 14 and 16 are not the same, the etch lines 34 across the blade make it very easy for one to find the appropriate aperture 24 into which a pencil or scribing tool would be inserted in order to draw a line as determined by the marking on the scale along either of the edges 14 and 16. For example, the aperture indicated by the numeral 7 adjacent the longitudinal edge 14 in FIG. 2 would indicate a distance of 7 inches from the extreme right-hand edge of the blade 12. Following the etch line 34 extending from the numeral 7 toward the opposite edge 16 of the blade 12, it is seen that the etch line joins with a marking adjacent the edge 16 which corresponds to a distance of $5\frac{5}{8}$" from the intersection of the edge 16 of the blade 12 and the adjacent edge 50 of the handle portion yet to be described. However, the aperture adjacent the numeral 7 can be easily located regardless of whether it is desired to mark off the 7 inch dimension from the extreme end of the blade 12 or the 5⅝" dimension from the edge 50 of the handle portion as a result of the etch line extending across the blade 12 between the two dimensions.

As already indicated, the combination tool 12 is provided with a handle portion generally indicated by the numeral 40, the handle portion being rigidly connected in the manner described below to one end of the blade 12 so that the longitudinal axis of the handle is disposed at a precise 90° angle to the longitudinal axis of the blade member. As best seen in the sectional views shown in FIGS. 4 and 5, the handle member 40 is molded of a pair of similiarly shaped shells 42 and 44, each of which are molded of a suitable clear plastic or polycarbonate material such as sold under the trademark "Lexan". Each shell is molded with a relatively narrow outer frame portion 46 which extends substantially around the entire perimeter of the shell. The outer longitudinal surfaces 48 define a pair of opposed, parallel longitudinal edges 50 and 52 of the handle member 40, the edges 50 and 52 being disposed at right angles respectively to the edges 16 and 14 of the blade member. As best seen in FIG. 1, the inner longitudinal edges of the frame portions 46 are very slightly curved so as to be concave relative to the inner portion of the handle 40. Each of the shells comprising the handle 40 is provided with an inner relatively wide body portion 54 and 56, each of these body portions extending longitudinally for a major portion of the length of the handle 40 and laterally between the outer frame portions 46. As best seen in FIG. 4, each of these body portions 54 and 56 have inner and outer curved surfaces which are concave and convex respectively along both the longitudinal and lateral axes of the shells. Thus, while this cannot be shown in a single figure, it should be apparent that the body portions or 54 and 56 constitute sections of a sphere having a relatively large diameter of which substantially rectangular portions of the sphere have been cut out and joined together in the manner shown in FIGS. 4 and 5 so as to provide a cavity having curved surfaces on at least the edges 50 and 52 of the handle portion and on the broad surfaced body portions 54 and 56 of the handle 40. There are two reasons for the particular shape of the shells 42 and 44 described above. The first is so that the handle 40 of the square can function as a liquid or bubble type level in at least spatial orientations of the square. The shells define a cavity which is filled with a liquid 60 which has an index of refraction that is identical to the index of refraction of the plastic material from which the shells 42 and 44 are molded. The cavity is about 99% filled with liquid so as to leave a small bubble 62 in the liquid which will act as an indicator or level. It will be understood that, by virtue of the curvature of both the inner edges of the frame portion 46 adjacent the outer edges 50 and 52 of the handle as well as the broad surfaced portions 54 and 56, the bubble 62 will tend to center itself relative to the handle portion when the square is resting on either of the longitudinal edges 50 and 52 or on opposite faces of the outer frame portion 46, thereby greatly increasing the convenience of use of the square as a plumb level.

In addition, since the index of refraction of the liquid 60 and that of the plastic material of the shells 42 and 44 are the same, the effect is as if the liquid and the plastic were the same material, that is, a solid piece of plastic material extending from the outer surface of the body portion 54 to the outer surface of the body portion 56 of each of the shells 42 and 44 respectively. The optical result of this is that the handle 40 over the body portions 54 and 56 becomes in effect a magnifying glass or a magnifier, and anything observed through this portion of the handle is magnified. The extent of the magnification obtained is of course dependent upon the curvature of the body portions 54 and 56 of the respective shells.

Figure 5:
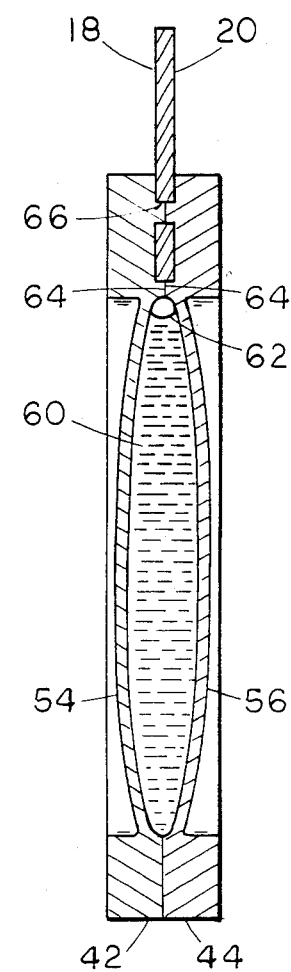
FIG. 5 is a sectional view of the handle portion of the tool taken on the line 5—5 of FIG. 1.

With particular reference to FIG. 5, it will be seen that the handle 40 is connected to the blade member 12 by means of a plurality of bosses 64 which extend thru apertures 66 formed in the blade number 12. The shells 42 and 44 are secured together by chemical solvent welding, that is, by applying a solvent which dissolves a very thin surface layer of the plastic material so that when the two shells are pressed together they are actually welded together to form an extremely strong bond. Since the shells are injection molded to the exact shape desired, it is a relatively simple matter to provide the bosses 64 in a location which lines up with the plurality of apertures 66 formed in the blade portion to receive the bosses 64 so that the blade member 12 is very rigidly held in the handle 40 and precisely at a right angle thereto.

I claim:

1. A combination square, scribing tool, plumb and level comprising
    A. an elongate rectangular blade member having a pair of opposed, parallel longitudinal edges and a pair of opposed parallel faces, at least one of said faces having spaced apart markings thereon along at least one of said longitudinal edes, said markings defining increments of linear measurement, and
    B. an elongate handle member connected to said blade member at one end thereof, said handle member having
        (1) a pair of opposed parallel longitudinal edges each disposed at a 90° angle to said longitudinal edge of said blade, and
        (2) a bubble type liquid level contained within said handle between said longitudinal edges, and
        (3) a pair of similarly shaped shells formed of a clear, transparent plastic material, said shells, when joined together, defining an elongate sealed cavity which extends for a major portion of the length and width of said handle member, said cavity being almost entirely filled with a liquid except for a relatively small bubble which is visible through the plastic material, and
    C. wherein each of said plastic shells comprise
        (1) a relatively narrow other frame portion, the outer longitudinal surfaces of which define said longitudinal edges and the inner longitudinal surfaces of which are curved very slightly so as to be concave, and
        (2) an inner relatively wide body portion which defines part of said cavity, each of said body portions having inner and outer curved surfaces which are concave and convex respectively along both the longitudinal and lateral axes of said shells, whereby said handle member functions as a level when the handle member portion rests upon one of said longitudinal edges and functions as a plumb indicator when the blade is held against a vertical surface.

2. A tool as set forth in claim 1 wherein the concave and convex curvature of said wide body portions is an arc of a sphere in both directions so that said body portions of said shells cooperate with said liquid to define a magnifying lens.

* * * * *